United States Patent
Liu et al.

(10) Patent No.: US 6,985,757 B2
(45) Date of Patent: Jan. 10, 2006

(54) SMART HOST POWER SUPPLY DETECTION FOR PC CARD WIRELESS MODEM

(75) Inventors: Ping Liu, Richmond (CA); Behrouz Pourseyed, Richmond (CA); Trong Hoang, Richmond (CA)

(73) Assignee: Sierra Wireless, Inc., Richmond (CA)

( * ) Notice: Subject to any disclaimer, the term of this patent is extended or adjusted under 35 U.S.C. 154(b) by 564 days.

(21) Appl. No.: 10/245,761

(22) Filed: Sep. 16, 2002

(65) Prior Publication Data
US 2004/0204091 A1   Oct. 14, 2004

(51) Int. Cl.
*H04B 1/38*     (2006.01)
*H04M 1/00*     (2006.01)

(52) U.S. Cl. .................. 455/558; 455/127.1; 455/571; 455/572; 455/552.1; 455/414.1; 375/222

(58) Field of Classification Search ................ 455/558, 455/557, 571, 572, 573, 574, 552.1, 127.1, 455/127.2, 414.1; 375/222; 713/300, 340
See application file for complete search history.

(56) References Cited

U.S. PATENT DOCUMENTS

| | | | |
|---|---|---|---|
| 5,697,076 A | * | 12/1997 | Troyk et al. ............. 455/127.1 |
| 5,768,147 A | | 6/1998 | Young |
| 5,778,325 A | | 7/1998 | Lindell et al. |
| 5,805,473 A | | 9/1998 | Hadderman .................. 364/707 |
| 5,999,832 A | * | 12/1999 | Vannatta et al. .......... 455/575.1 |
| 6,028,755 A | * | 2/2000 | Saeki et al. ................ 361/91.1 |
| 6,169,884 B1 | * | 1/2001 | Funk ........................... 455/522 |
| 6,285,092 B1 | | 9/2001 | Kawahara et al. |
| 2001/0042152 A1 | | 11/2001 | Kobayashi |
| 2004/0198288 A1 | * | 10/2004 | Sadowski .................... 455/259 |

* cited by examiner

*Primary Examiner*—Nay Maung
*Assistant Examiner*—Shaima Q. Aminzay
(74) *Attorney, Agent, or Firm*—Thelen Reid & Priest LLP

(57) ABSTRACT

Methods of and apparatuses for characterizing the power supplying capabilities of host power supplies providing power to wireless modems. According to an exemplary method, an equivalent series resistance of the power supply is determined and compared to a plurality of maximum equivalent series resistance values associated with a corresponding plurality of transmission power classes. Each power class is designated as a permissible power class at which the wireless modem may be configured to transmit, for each maximum equivalent series resistance value that is greater than the equivalent series resistance of the power supply.

30 Claims, 7 Drawing Sheets

| TX Class and Slot Configuration | Known Ipeak (mA) | Max Resr (m-ohm) |
|---|---|---|
| 1 slot, 1W | 600 | 1300 |
| 2 slots, 1W | 750 | 1070 |
| 4 slots, 1W | 950 | 840 |
| 1 slot, 2W | 750 | 1070 |
| 2 slots, 2W | 900 | 880 |
| 4 slots, 2W | 1100 | 730 |

FIGURE 5

SMART HOST POWER SUPPLY DETECTION FOR PC CARD WIRELESS MODEM

FIELD OF THE INVENTION

The present invention relates to wireless communications. More specifically, the present invention relates to methods of and apparatuses for determining the power supplying capabilities of host power supplies of host computers providing power to PC card wireless modems.

BACKGROUND OF THE INVENTION

Many modern portable computers, including laptops and personal digital assistants (PDAs), have a built-in PCMCIA slot (i.e. socket) for accepting another electronic device packaged in a PC (personal computer) card conforming to the PCMCIA standard. PCMCIA (Personal Computer Memory Card International Association) is an organization that was formed in 1989 with the original purpose of developing and promoting standards for PC cards that could provide additional memory resources for the host computer. This purpose has since expanded to encompass other types of electronic devices such as, for example, PC card wireless modems that are capable of communicating with a remote device over a wireless link.

FIG. 1 shows a block diagram of a wireless-communication-enabled computer system 10 comprising a host computer 100 and a PC card wireless modem 102. PC card wireless modem 102 includes an antenna 104 for transmitting/receiving radio frequency (RF) signals to/from a remote device over a wireless network. PC card wireless modem 102 also includes various input/output (I/O), power and ground terminals 106, which are arranged according to the PCMCIA standard. Host computer 100 communicates with PC card wireless modem 102 via a PCMCIA interface 108, when terminals 106 are plugged into a PCMCIA slot 110 of host computer 100. PCMCIA interface 108 not only provides a communication means, it also includes power and ground terminals that couple a power supply of host computer 100 to the power and ground terminals of PC card wireless modem 102.

FIG. 2 shows a wireless communications system 20 that includes a wireless-communication-enabled host computer, such as that shown in FIG. 1. A host computer 200, shown as a laptop, has a PCMCIA slot 202 with a PC card wireless modem 204 plugged into the slot 202. PC card wireless modem 204 has an antenna 206 that transmits/receives RF signals modulated by data and voice information to/from a base station 208 over a wireless link 210. Base station 208 transmits/receives voice modulated signals to/from a mobile switching center 212, which communicates with a remote device (e.g. a telephone) over the PSTN (Public Switched Telephone Network) 214. Base station 208 also transmits/receives data modulated signals to an ISP (Internet Service Provider) Server 216. ISP server 216 transmits/receives data to/from a gateway/router 218, which sends/receives the data to/from a remote over the Internet 220.

Base station 208 in FIG. 2 may be associated with any number of networks. For example, it may be associated with a pager network or a wireless communications network used by cellular telephones. One particular cellular telephone network that is in common use in Europe and of increasing use throughout the rest of the world is GSM (Global System for Mobile communications). Besides functioning as a voice network, GSM is becoming particularly attractive to users and developers of wireless-communication-enabled computers, such as the ones described above in connection with FIGS. 1 and 2. A large reason for this is that GSM supports packet-switched data protocols like GPRS (General Packet Radio Service). Packet-switched data makes more efficient use of available bandwidth and is typically faster than traditional circuit-switched data protocols. GPRS also supports the Internet Protocol (IP), thereby allowing users of a computing device with a GPRS-compatible PC card wireless modem to gain access to the Internet.

GPRS operates by allocating timeslots for packet data transmissions upon a request by a user and freeing up timeslots when not required by the user. The wireless-communication-enabled computer system breaks down an Internet TCP/IP (Transmission Control Protocol/Internet Protcol) data message into data packets. When the data is ready to be sent, the network assigns timeslots on a channel for the transmission. The GPRS-compatible modem transmits the data packets in the assigned timeslots to the cellular base-station where the packets are reassembled into the original TCP/IP data message and finally passed to the Internet for transport to the destination.

Timeslots in a GSM/GPRS network are delineated similar to that in TDMA (Time Division Multiple Access) technology. Each channel is divided into eight timeslots, which are then allocated to different requesting users. More than one timeslot may be requested and allocated to increases the rate at which the modem is permitted to transmit data. However, when this is done more power is demanded from the host power supply, which explained above, functions as the power source of the modem. When the current increases, the voltage supplied by the host power supply tends to drop, due to the internal resistance of the power supply. If the current demanded by the modem exceeds that capable of being delivered by the host supply, the host power supply may be damaged and/or the modem may shut down or reset. Unfortunately, the PC card wireless modem does not know what the supplying capability of the host power supply is.

One solution proposed to avoid the current overdraw problem is to include a supplemental battery pack on the PC card. This approach is undesirable, however, as it increases the size of the PC card, making it more bulky and less popular with users. Another solution would be to simply reduce or limit the RF power of the modem. This approach is also undesirable, however, as it reduces the range of operation of the modem and also unnecessarily sacrifices performance of systems in which the power supply is not the limiting factor.

SUMMARY OF THE INVENTION

Generally, methods of and apparatuses for characterizing the power supplying capabilities of host power supplies of host computers providing power to a PC card wireless modem are disclosed. The host computer may comprise any computer device, such as a laptop or personal digital assistant (PDA), which is configured to provide power to the PC card wireless modem.

According to one aspect of the invention, a method of determining permissible transmission power classes of a wireless modem, comprises the steps of determining an equivalent series resistance of the power supply, comparing the equivalent series resistance of the power supply to a plurality of maximum equivalent series resistance values associated with a corresponding plurality of transmission power classes, and designating each power class as a permisssible power class at which the wireless modem may be configured to transmit for each maximum equivalent series resistance value that is greater than the equivalent series resistance of the power supply.

According to another aspect of the invention, a method of determining whether a power supply of a host computer is capable of providing sufficient power to a PC card wireless modem, comprises the steps of determining a maximum allowable equivalent series resistance of a power supply configured to supply power to the PC card wireless modem when the modem is configured to transmit at a particular transmission power class and slot configuration, inserting the PC card wireless modem into a PCMCIA slot of a host computer having a host power supply, determining an equivalent series resistance of the host power supply, comparing the maximum allowable equivalent series resistance to the equivalent series resistance of the host power supply, and determining that the host power supply is capable of providing sufficient power to the PC card wireless modem if the equivalent series resistance of the host power supply is less than the maximum equivalent series resistance.

According to another aspect of the present invention, a wireless modem capable of configuring itself to one of a plurality of particular transmission power classes and slot configurations, comprises a DC/DC converter having a power input coupled to an output of a power supply, an analog-to-digital converter (ADC) operable to convert an input voltage applied to the power input of the DC/DC converter when the wireless modem is configured to draw a known current from the power supply, and a baseband processor operable to calculate an equivalent series resistance of the power supply, based on the input voltage applied to the power input of the DC/DC converter and the current drawn from the power supply. The baseband processor is also operable to compare the calculated equivalent series resistance to a plurality of maximum equivalent resistance values associated with a corresponding plurality of transmission power classes and slot configurations.

According to yet another aspect of the present invention, a wireless modem capable of configuring itself to one of a plurality of particular transmission power classes and slot configurations comprises a DC/DC converter means for converting an input voltage from a power supply to an output voltage, analog-to-digital converter means for converting said input voltage to a digital signal when the wireless modem is configured to draw a known current from the power supply, and baseband processor means for calculating an equivalent series resistance of the power supply, based on the input voltage applied to the power input of the DC/DC converter and the current drawn from the power supply. The baseband processor means also functions to compare the calculated equivalent series resistance to a plurality of maximum equivalent resistance values associated with a corresponding plurality of transmission power classes and slot configurations.

Other aspects of the invention are described and claimed below, and a further understanding of the nature and advantages of the inventions may be realized by reference to the remaining portions of the specification and the attached drawings.

BRIEF DESCRIPTION OF THE DRAWINGS

FIG. 5 shows an exemplary classification table for a GSM/GPRS PC card wireless modem, including $R_{esr}$(max) values associated with various power transmission power classes and slot configurations, according to a specific exemplary embodiment of the present invention;

DETAILED DESCRIPTION OF THE INVENTION

Those of ordinary skill in the art will understand that the following detailed description of the present invention is illustrative only and is not intended to be in any way limiting. Other embodiments of the present invention will readily suggest themselves to such skilled persons having the benefit of this disclosure. Reference will now be made in detail to exemplary implementations of the present invention as illustrated in the accompanying drawings. The same reference indicators will be used throughout the drawings and the following detailed description to refer to the same or like elements.

Figure 1:
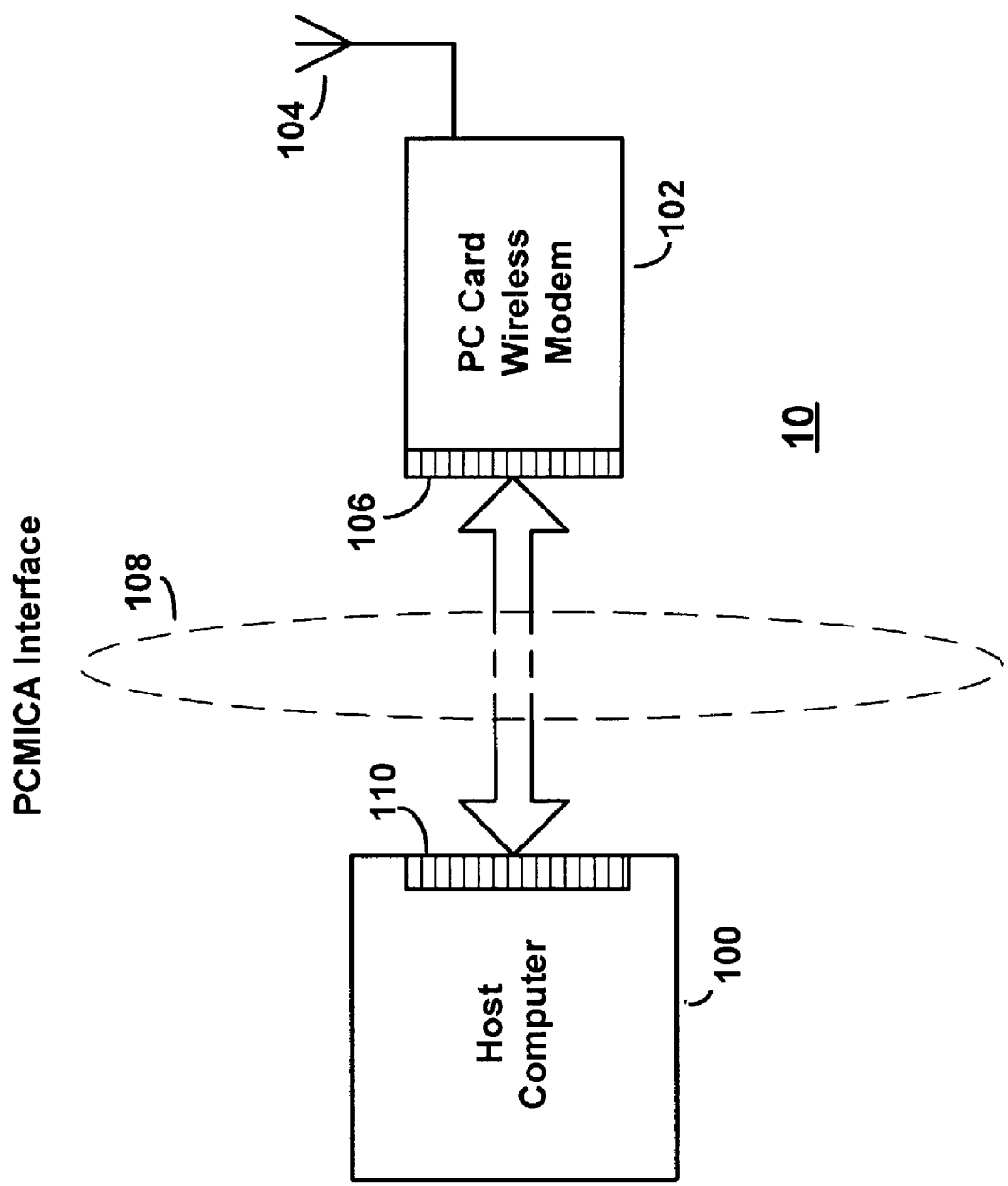
FIG. 1 shows a block diagram of a wireless-communication-enabled computer system comprising a host computer and a PC card wireless modem.
Figure 2:
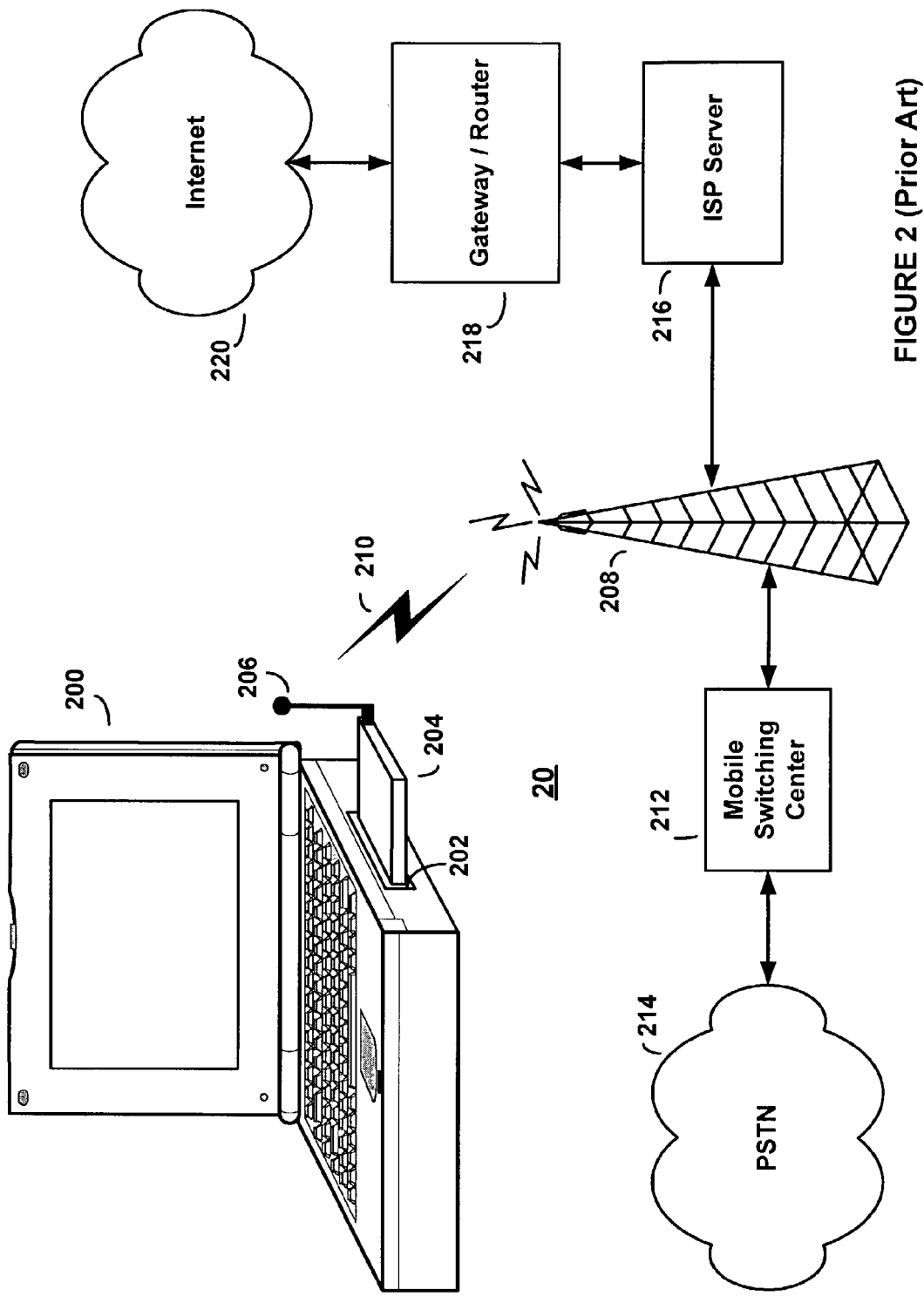
FIG. 2 shows a wireless communications system that includes a wireless-communication-enabled host computer, such as that shown in FIG. 1.
Figure 3:
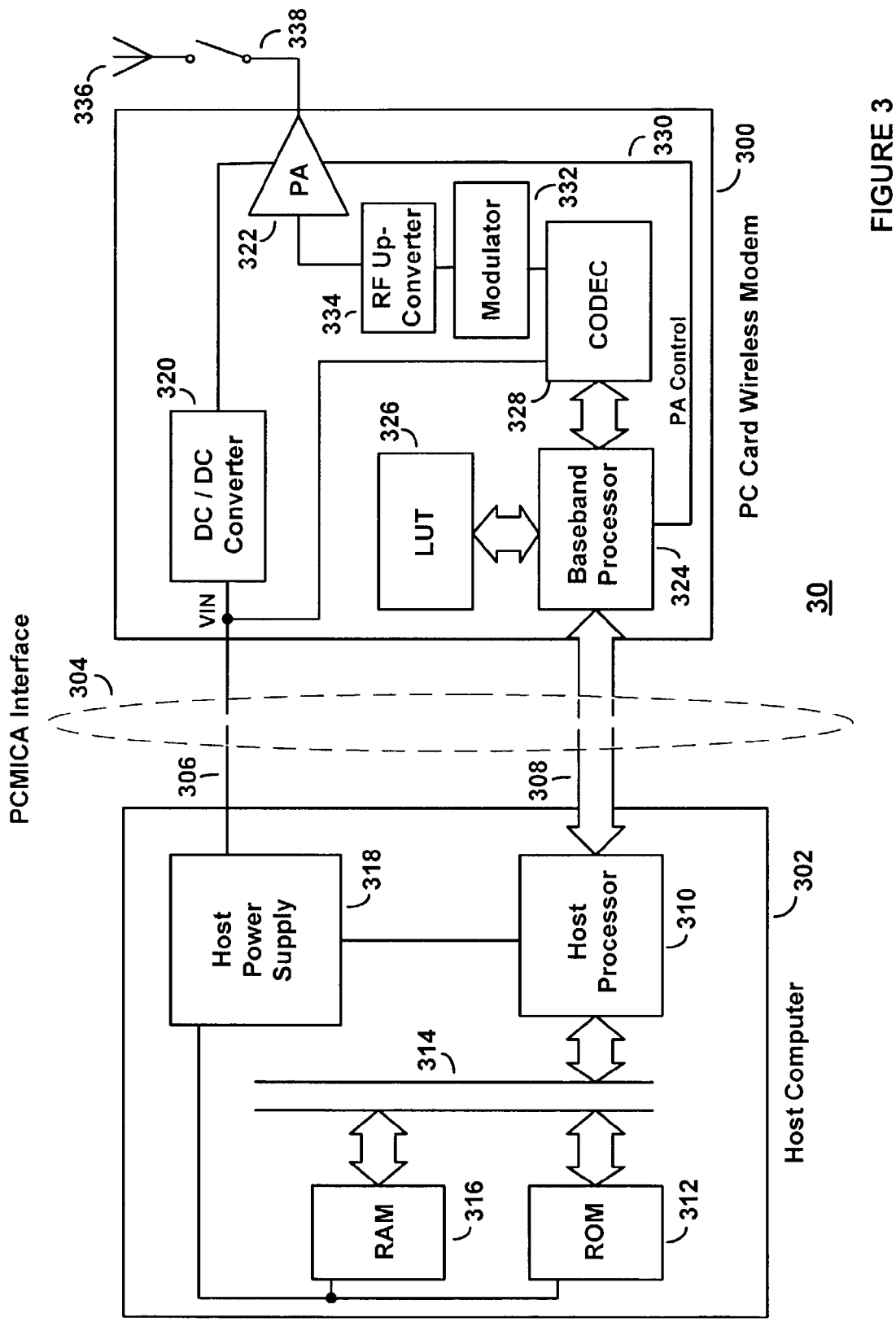
FIG. 3 shows a block diagram of a system for characterizing the current supplying capability of a host power supply of a host computer supplying power to a PC card wireless modem, according to an embodiment of the present invention.

Referring to FIG. 3, there is shown a block diagram of a system 30 for characterizing the current supplying capability of a host power supply of a host computer supplying power to a PC card wireless modem, according to an embodiment of the present invention. A PC card wireless modem 300 communicates with and is powered by a host computer 302, via a PCMCIA interface 304 comprising a power bus 306 and communications bus 308. Host computer 302 includes a host processor 310, which addresses and receives processing instructions from a read only memory (ROM) 312 via host computer system bus 314. A random access memory (RAM) 316 is also coupled to host computer system bus 314 and provides temporary storage of data, address, and control information processed by, or to be processed by, host processor 310. Host processor 310, ROM 312, RAM 316 and other electrical components of host computer 302 not shown in FIG. 3 are powered by a host power supply 318. The illustrations of both PC card wireless modem 300 and host computer 302 are simplified and do not include components that are not necessary to understand the inventions described herein. For example, whereas only the salient portions of the transmitting portion of the modem PC card wireless modem are illustrated in block 300, those skilled in the art will readily understand that modem 300 also includes a receiving portion.

PC card wireless modem 300 is powered by host power supply 318. Specifically, a DC/DC converter 320 of PC card wireless modem 300 is coupled to power bus 306, such that host power supply 318 may provide power to PC card wireless modem 300. DC/DC converter 320 operates to translate the voltage supplied by the host power supply (e.g. 5 volts) to a voltage that is appropriate to power up the modem (e.g. 3.3 volts). DC/DC converter 320 supplies power to, among other components on PC card wireless modem 300, a power amplifier (PA) 322. PA 322 amplifies radio frequency RF signals modulated by data messages originating from host computer 302. The data messages, which are originally digitally formatted, are delivered over communications bus 308 to a baseband processor 324. Baseband processor 324 processes and formats the digital data messages according to information stored in the look-up-table (LUT) 326 and then sends the processed messages to a digital-to-analog converter DAC in CODEC 328. Baseband processor 324 also provides a PA control signal to PA 322, on PA control line 330, to control the amount by which PA 322 amplifies the RF signals. After the DAC in CODEC 328 converts the digital data messages into analog signals, the analog signals are modulated and converted to intermediate frequency (IF) signals by modulator 332 and then ultimately up-converted to radio frequency (RF) signals by RF up-converter 334. The RF signals are then amplified by PA 322 and transmitted by an antenna 336 over a wireless link to a remote destination, so long as switch 338 is closed. If switch 338 is open, antenna 336 does not radiate the RF signals. Accordingly, the function of switch 338 is to connect/disconnect antenna 336 to/from the output of PA 322. By disconnecting antenna 336, the PC card wireless modem 300 and host power supply 318 may be tested and characterized without having to transmit the RF signals, which under test conditions may not be in compliance with wireless communications regulations, e.g., regulations set forth by the Federal Communications Commission in the United States of America.

As described in more detail below, baseband processor 324 configures PC card wireless modem 300 to transmit in a power class and/or slot configuration depending on the current supplying capabilities of host power supply 318 and information stored in LUT 326. LUT 326 comprises a memory device, for example a FLASH memory chip, which contains a list of maximum equivalent series resistance $R_{esr}$(max) values that the equivalent series resistance $R_{esr}$ of a host power supply must not exceed when the PC card wireless modem 300 is operating according to a corresponding power class and slot configuration. As explained in the next paragraph, the $R_{esr}$(max) values are determined and stored in LUT 326 prior to characterizing the equivalent series resistance $R_{esr}$ of host power supply 318.

Figure 4:
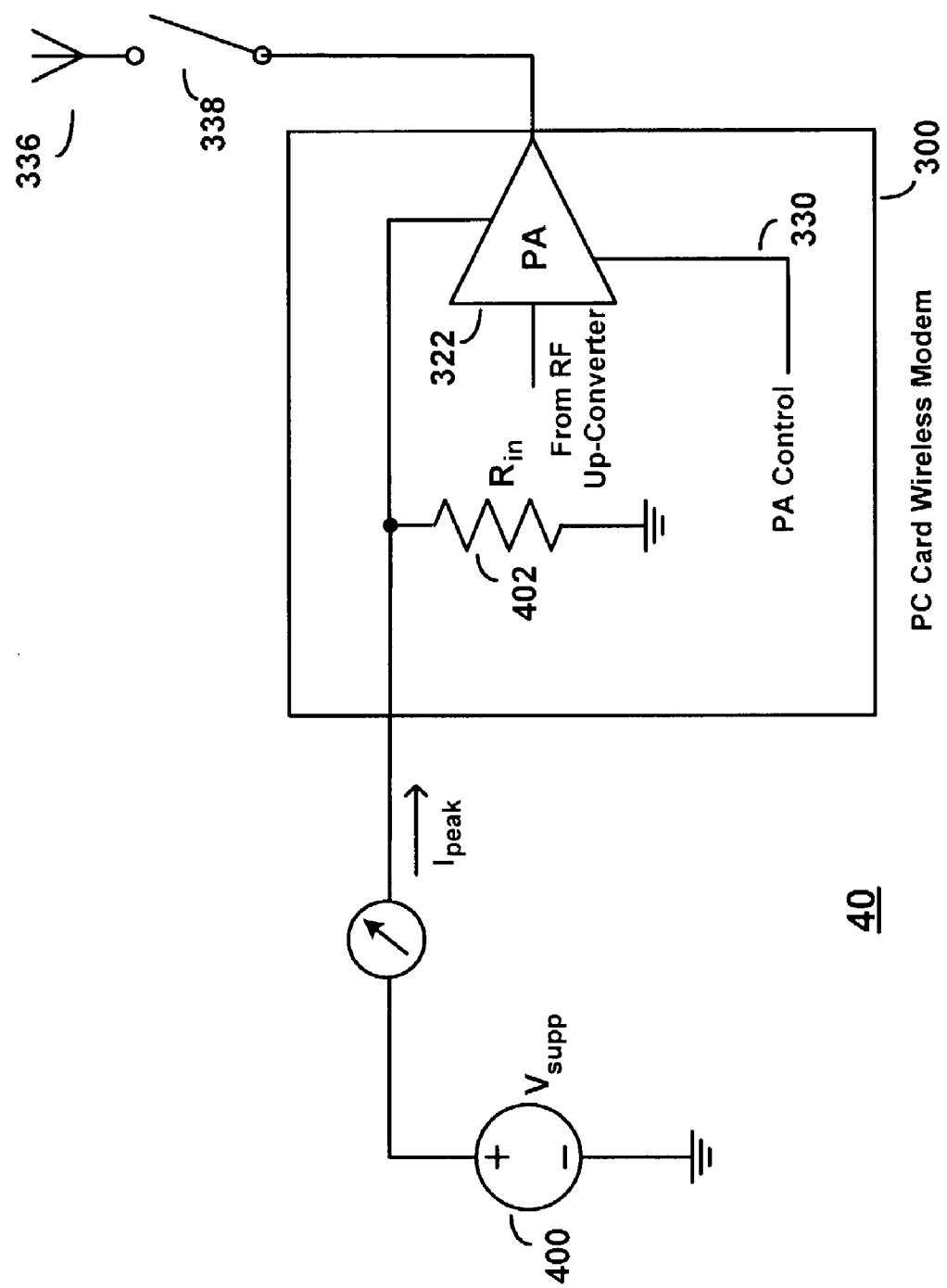
FIG. 4 shows a test set-up, which may be used to determine a plurality of $R_{esr}$(max) values of a PC card wireless modem, the $R_{esr}$(max) values associated with a corresponding plurality of transmission power classes and slot configurations.

FIG. 4 shows a test set-up 40, which may be used to determine the $R_{esr}$(max) values for storing in LUT 326. Test set-up 40 includes a test power supply 400 capable of delivering any amount of current demanded by PC card wireless modem. Hence, power supply 400 may be treated as an ideal power supply under all test conditions. From the perspective of test power supply 400, PC card wireless modem 300 presents an input resistance, represented by resistor $R_{in}$ 402 in FIG. 4. During testing, baseband processor 324 (see FIG. 3) of PC card wireless modem 300 and PA control line 330 are set so that PC card wireless modem 300 transmits in accordance with a variety of power classes and slot configurations. Switch 338 remains open during testing so that antenna 336 does not radiate while the testing is being performed. This ensures that any wireless communications RF regulations are not violated.

For each power class and slot configuration, the peak current $I_{peak}$ drawn by PC card wireless modem 300 is measured and recorded. Then, for each of these measured peak currents an $R_{esr}$(max) is determined according to the following formula:

$$R_{esr}(\max)=(V_{supp}-V_{reg}(\min))/I_{peak} \qquad (1)$$

where $V_{reg}$(min) is the minimum voltage required at the input of DC/DC converter 320 of PC card wireless modem 300 to maintain proper voltage regulation.

Each $R_{esr}$(max) value corresponds to a specific transmission power class and slot transmission configuration that is unique to PC card wireless modem 300. These $R_{esr}$(max) values are stored in LUT 326. As explained in more detail below, the equivalent series resistance $R_{esr}$ of host power supply 318 is measured and compared to the $R_{esr}$(max) values stored in LUT 326 to determine which power classes and slot configurations host power supply 318 is capable of supporting. FIG. 5 shows an exemplary classification table for a GSM/GPRS PC card wireless modem for various transmission (TX) power classes and slot configurations. Similar classification tables can be created for other types of cellular networks, e.g., DCS (Digital Communication System), PCS (Personal Communications Service), etc. The peak currents $I_{peak}$ recorded in the table in FIG. 5 were measured according to the method described above and the corresponding $R_{esr}$(max) values were determined using formula (1) with a $V_{reg}$(min) of 4.2 volts.

Figure 6:
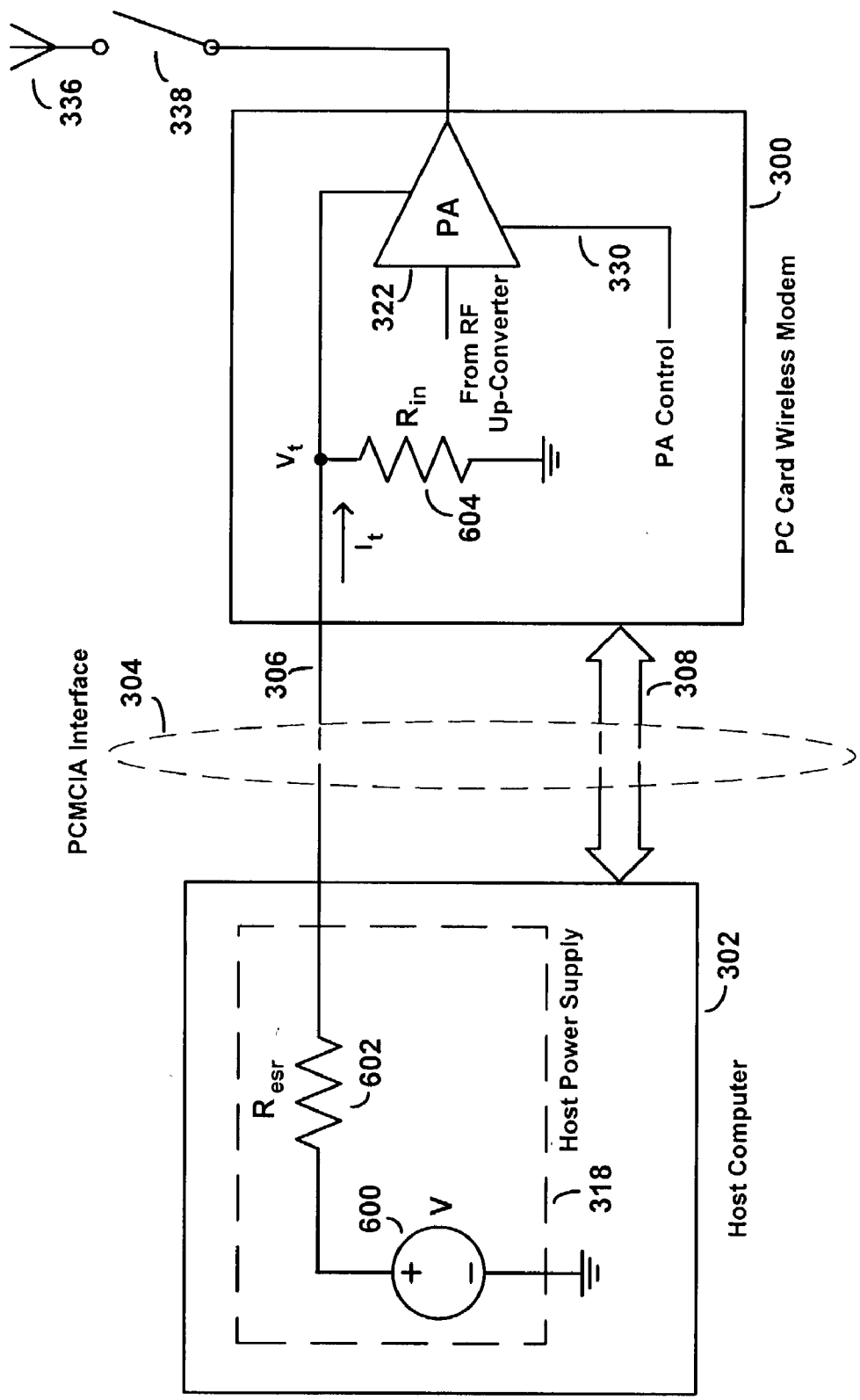
FIG. 6 shows a simplified diagram of the system in FIG. 3, which may be used to characterize the current supplying capability of host power supply of a host computer, while supplying power to a PC card wireless modem, according to an embodiment of the present invention.

Referring now to FIG. 6, there is shown a simplified diagram of system 30 in FIG. 3, for characterizing the current supplying capability of host power supply 318 while supplying power to PC card wireless modem 300, according to an embodiment of the present invention. Host computer 302 includes a power supply 318 that provides power to PC card wireless modem 300 via power bus 306, which explained above comprises part of PCMCIA Interface 304. Host power supply 318 comprises an ideal voltage supply component 600 and an equivalent series resistor 602 having an equivalent series resistance $R_{esr}$. From the perspective of host power supply 318, PC card wireless modem 300 presents an input resistance, which is represented by resistor $R_{in}$ 604 in FIG. 6.

Figure 7:
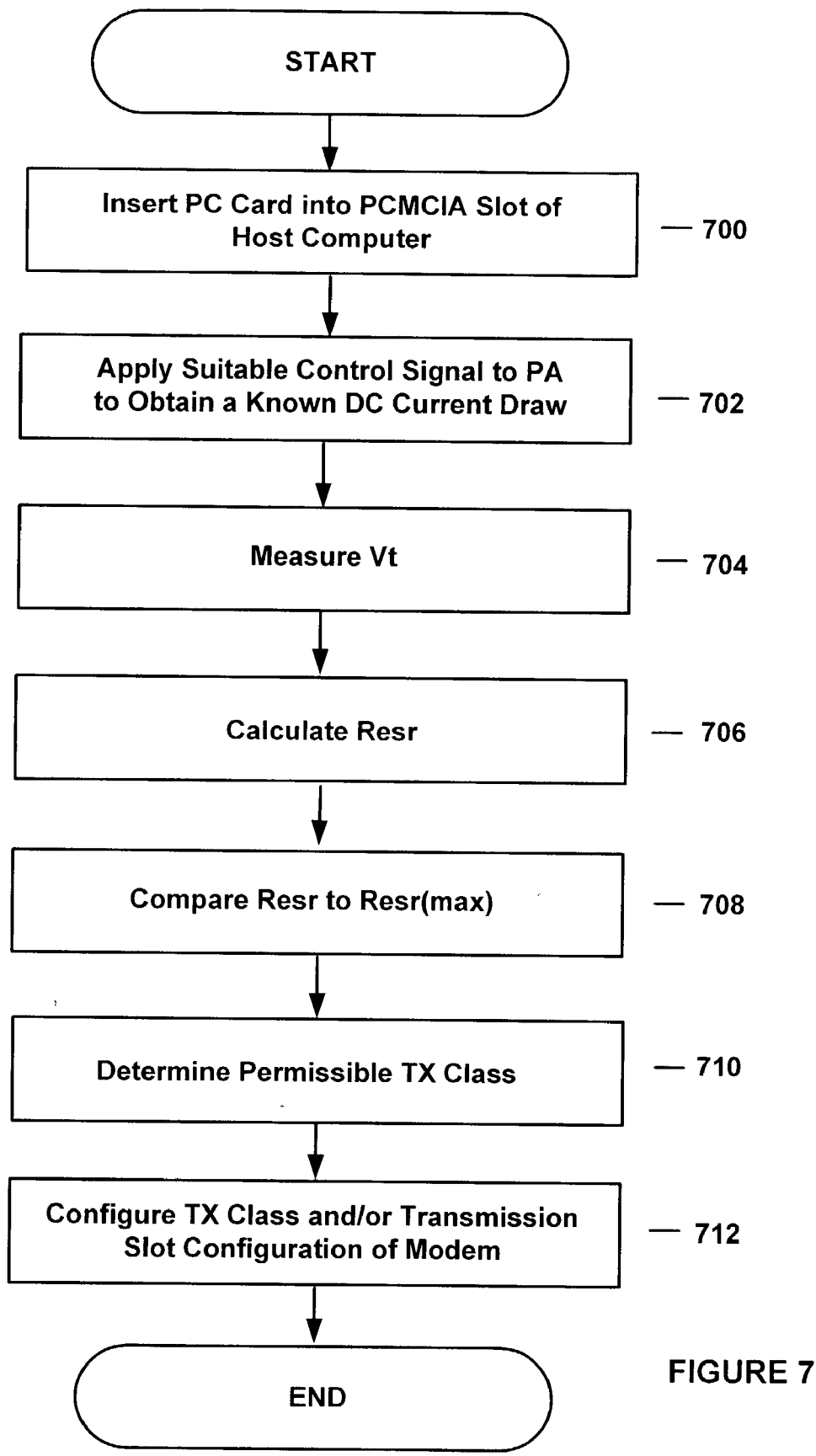
FIG. 7 shows a method of characterizing the equivalent series resistance $R_{esr}$ of a host power supply, according to an embodiment of the present invention.

Referring now to FIG. 7, there is shown a method 70 of characterizing the equivalent series resistance $R_{esr}$ of host power supply 318, according to an embodiment of the present invention. First, at step 700 PC card wireless modem 300 is inserted into the PCMCIA slot of host computer 302, thereby interfacing PC card wireless modem in accordance with PCMCIA interface 304. Next, at step 702 baseband processor 324 sends a PA control signal on PA control line 330 to PA 322, to adjust the modem so that the modem test input current $I_t$ is set to a constant value (e.g. 1 A in one exemplary embodiment) within the normal supply range of host power supply 318. With this known test current being drawn, at step 704 the test input voltage $V_t$ applied to PC card wireless modem 300 is measured and recorded. Test input voltage $V_t$ may be measured by an external voltage-measuring device (e.g. a voltmeter) or by an analog-to-digital converter ADC in CODEC 328. With knowledge of $V_t$ and $I_t$ and the input voltage and current $V_i$ and $I_i$ of the modem in its idle state, the equivalent series resistance $R_{esr}$ of power supply 318 is calculated in step 706 using the following formula:

$$R_{esr}=(V_t-V_i)/(I_t-I_i) \qquad (2)$$

Note that the idle voltage and current, $V_i$ and $I_i$, can be measured during manufacturing testing or in a test set-up similar to that shown and described in connection with FIG.

4 or 6. Formula (2) is based on the observation that the $R_{esr}$ of most power supplies remains essentially constant, at least over the range of load currents applied in the formula.

After the equivalent series resistance $R_{esr}$ of host power supply 318 is calculated, at step 708 baseband processor 324 compares $R_{esr}$ of host power supply 318 to the $R_{esr}$(max) values stored in LUT 326. Based on the comparison in step 708, at step 710 baseband processor 324 determines the permissible transmission power classes and slot configurations that PC card wireless modem 300 may operate at when powered by host power supply 318. As an example, if the $R_{esr}$ of host power supply is calculated to be 900 mΩ and the $R_{esr}$(max) values stored in LUT 326 are those shown in the classification table in FIG. 5, baseband processor 324 would determine that, when powered by a power supply like host power supply 318, PC card wireless modem 300 could be configured for single or dual slot transmission at 1 W or single slot transmission at 2 W. Because the $R_{esr}$(max) values for the other slot configurations and power classes are less than $R_{esr}$=900 mΩ, they would not be permissible when being powered by a power supply like host power supply 318. Finally, at step 712 baseband processor 320 configures PC card wireless modem 300 so that it transmits according to one of the permissible power class and slot configurations determined in step 710.

Whereas the above is a complete description of the preferred embodiments of the invention, various alternatives, modifications, and equivalents may be used. For example, whereas a PC card socketed in a PCMCIA slot of a host computer has been described in the exemplary embodiments above, the methods described above also apply to other types of card/slot types where a host device includes a host supply that provides power to the wireless modem. Therefore, the above description should not be taken as limiting the scope of the invention, which is defined by the appended claims.

What is claimed is:

1. A method of determining permissible transmission power classes of a wireless modem, comprising the steps of:
   determining an equivalent series resistance of the power supply;
   comparing the equivalent series resistance of the power supply to a plurality of maximum equivalent series resistance values associated with a corresponding plurality of transmission power classes; and
   designating each power class as a permissible power class at which the wireless modem may be configured to transmit, for each maximum equivalent series resistance value that is greater than the equivalent series resistance of the power supply.

2. The method of claim 1 wherein the wireless modem comprises a PC card wireless modem and the power supply comprises a host power supply of a host computer.

3. The method of claim 2 wherein the PC card wireless modem communicates with and is powered by the host computer via a PCMCIA interface.

4. The method of claim 1, further comprising a step of configuring the modem to transmit according to one of the permissible transmission power classes.

5. The method of claim 1 wherein each transmission power class includes the number of transmission slots to be used for transmitting packet-switched data over a cellular network.

6. The method of claim 5 wherein the cellular network comprises the Global System for Mobile Communications (GSM) network.

7. The method of claim 5 wherein the cellular network comprises the Personal Communications Service (PCS) network.

8. A method of determining whether a power supply of a host computer is capable of providing sufficient power to a PC card wireless modem, said method comprising the steps of:
   determining a maximum allowable equivalent series resistance of a power supply configured to supply power to the PC card wireless modem when the modem is configured to transmit at a particular transmission power class and slot configuration;
   inserting the PC card wireless modem into a PCMCIA slot of a host computer having a host power supply;
   determining an equivalent series resistance of the host power supply;
   comparing the maximum allowable equivalent series resistance to the equivalent series resistance of the host power supply; and
   determining that the host power supply is capable of providing sufficient power to the PC card wireless modem if the equivalent series resistance of the host power supply is less than the maximum equivalent series resistance.

9. The method of claim 8, further comprising a step of configuring the modem to transmit according to the particular transmission power class and slot configuration.

10. The method of claim 1 wherein data to be transmitted by the modem comprises packet-switched data for transmitting over a cellular network.

11. The method of claim 10 wherein the cellular network comprises the Global System for Mobile Communications (GSM) network.

12. The method of claim 11 wherein the cellular network comprises the Personal Communications Service (PCS) network.

13. A wireless modem capable of configuring itself to one of a plurality of particular transmission power classes and slot configurations, comprising:
   a DC/DC converter having a power input coupled to an output of a power supply;
   an analog-to-digital converter (ADC) operable to convert an input voltage applied to the power input of the DC/DC converter when the wireless modem is configured to draw a known current from the power supply; and
   a baseband processor operable to calculate an equivalent series resistance of the power supply, based on the input voltage applied to the power input of the DC/DC converter and the current drawn from the power supply, and compare the calculated equivalent series resistance to a plurality of maximum equivalent resistance values associated with a corresponding plurality of transmission power classes and slot configurations.

14. The wireless modem of claim 13 wherein the baseband processor configures the wireless modem to transmit according to any one of the plurality of transmission power classes and slot configurations of which the equivalent series resistance of the power supply is less than the corresponding maximum equivalent resistance values.

15. The wireless modem of claim 13, further comprising a memory in communication with the baseband processor and configured to store the plurality of maximum equivalent series resistance values.

16. The wireless modem of claim 13 wherein the wireless modem comprises a PC card wireless modem and the power supply comprises a host power supply of a host computer.

17. The wireless modem of claim 16 wherein the PC card wireless modem communicates with and is powered by the host computer via a PCMCIA interface.

18. The wireless modem of claim 13 wherein the baseband processor configures data to be transmitted by the wireless modem as packet-switched data suitable for transmission over a cellular network.

19. The wireless modem of claim 18 wherein the cellular network comprises the Global System for Mobile Communications (GSM) network.

20. The wireless modem of claim 18 wherein the cellular network comprises the Personal Communications Service (PCS) network.

21. The wireless modem of claim 16 wherein the baseband processor configures data to be transmitted by the PC card wireless modem as packet-switched data suitable for transmission over a cellular network.

22. The wireless modem of claim 21 wherein the cellular network comprises the Global System for Mobile Communications (GSM) network.

23. The wireless modem of claim 21 wherein the cellular network comprises the Personal Communications Service (PCS) network.

24. A wireless modem capable of configuring itself to one of a plurality of particular transmission power classes and slot configurations, comprising:
   a DC/DC converter means for converting an input voltage from a power supply to an output voltage;
   analog-to-digital converter means for converting said input voltage to a digital signal when the wireless modem is configured to draw a known current from the power supply; and
   baseband processor means for calculating an equivalent series resistance of the power supply, based on the input voltage applied to the power input of the DC/DC converter and the current drawn from the power supply, and for comparing the calculated equivalent series resistance to a plurality of maximum equivalent resistance values associated with a corresponding plurality of transmission power classes and slot configurations.

25. The wireless modem of claim 24 wherein the baseband processor means is further operable to configure the wireless modem to transmit according to any one of the plurality of transmission power classes and slot configurations of which the equivalent series resistance of the power supply is less than the corresponding maximum equivalent resistance values.

26. The wireless modem of claim 24, further comprising memory means for storing and providing store the plurality of maximum equivalent series resistance values.

27. The wireless modem of claim 24 wherein the wireless modem comprises a PC card wireless modem and the power supply comprises a host power supply of a host computer.

28. The wireless modem of claim 24 wherein the baseband processor means is further operable to configure data to be transmitted by the wireless modem as packet-switched data suitable for transmission over a cellular network.

29. The wireless modem of claim 28 wherein the cellular network comprises the Global System for Mobile Communications (GSM) network.

30. The wireless modem of claim 28 wherein the cellular network comprises the Personal Communications Service (PCS) network.

\* \* \* \* \*